United States Patent
Fritz et al.

[11] Patent Number: 6,166,169
[45] Date of Patent: Dec. 26, 2000

[54] ALIPHATIC POLYESTERS AND/OR COPOLYESTERS AND A PROCESS FOR THE PRODUCTION THEREOF

[75] Inventors: Hans-Gerhard Fritz, Uhingen; Sven Jacobsen, Esslingen am Neckar, both of Germany; Robert Jerome, Tilff, Belgium; Philippe Degee, Grace-Hollogne, Belgium; Philippe Dubois, Ciplet, Belgium

[73] Assignee: Brussels Biotech, Brussels, Belgium

[21] Appl. No.: 09/232,144

[22] Filed: Jan. 15, 1999

Related U.S. Application Data

[63] Continuation of application No. PCT/BE97/00081, Jul. 11, 1997.

[30] Foreign Application Priority Data

Jul. 15, 1996 [DE] Germany ............... 196 28 472

[51] Int. Cl.⁷ ............................................. C08G 63/02
[52] U.S. Cl. ....................... 528/272; 528/176; 528/271
[58] Field of Search ................... 528/176, 271, 528/272

[56] References Cited

U.S. PATENT DOCUMENTS

| | | | |
|---|---|---|---|
| 3,752,828 | 8/1973 | Best | 260/343 |
| 4,379,914 | 4/1983 | Lundberg | 528/354 |
| 5,378,801 | 1/1995 | Reichert et al. | 528/354 |

FOREIGN PATENT DOCUMENTS

| | | |
|---|---|---|
| 1008099 | 1/1996 | Belgium . |
| 0372221 | 6/1990 | European Pat. Off. . |
| 2160405 | 6/1972 | Germany . |

OTHER PUBLICATIONS

Carriere, F.J., et al. "Polymerization of β-propiolactones by nickel carboxylate/tributylphosphate complexes$^{a)}$." Makromol. Chem. 189, No. 4, (1988) pp 717–722.

Dubois, R.J., et al. "Effect of Lewis bases on the ring–opening polymerization of ε–caprolactone and lactides initiated by aluminum alkoxides." Polymer Preprints, vol. 35, No. 2 (1994) pp 536–537.

Degee, P., et al. "Bulk polymerization of lactides initated by aluminum isopropoxide, $2^{a)}$" Macromol. Chem. Phys., vol. 198, No. 6 (1997), pp 1973–1984.

Watanabe, I., et al. "Catalyst for Preparation of *lactone* polymers with good thermal stability." Chemical Abstracts, vol. 122, No. 20 (1995) XP 002044184.

Invention Summary of BE 1008099 dated Jan. 16, 1996.

*Primary Examiner*—Terressa M. Boykin
*Attorney, Agent, or Firm*—Ladas & Parry

[57] ABSTRACT

An aliphatic polyester and/or copolyester, obtained from a polyreaction of at least one monomer from the group comprising lactides, lactones, cyclic carbonates and cyclic anhydrides. To be able to prepare the aliphatic polyester and/or copolyester a reaction mixture is used which contains at least one catalyst of the general formula (M) $(X_1, X_2 \ldots X)$, M being a metal selected from the group 3 to 12 of the periodic system $(X_1, X_2 \ldots X_m)$ being a substituent selected from one of the families of alkyls, aryls, oxides, carboxylates, halogenides, alkoxides and compounds with elements from group 15 and/or 16 of the periodic system, m being an integer in the range of from 1 to 6, and n being an integer in the range of from 0 to 6, and which also contains a co-catalyst of the general formula (Y) $(R_1, R_2 \ldots R_q)_p$, Y being an element selected from the group 15 or 16 of the periodic system. $(R_1, R_2 \ldots R_q)$ being a substituent selected from one of the families of the alkyls, aryls, oxides, halogenides, oxyalkyls, aminoalkyls, thiolkyls, phenoxides, aminioaryls, thioaryls, and q and p corresponding to the values for m and n.

25 Claims, 3 Drawing Sheets

ALIPHATIC POLYESTERS AND/OR COPOLYESTERS AND A PROCESS FOR THE PRODUCTION THEREOF

This application is a continuation of PCT/BE97/00081 filed Jul. 11, 1997.

The invention relates to an aliphatic polyester and/or copolyester, obtained from a polyreaction of at least one monomer from the group comprising lactides, lactones, cyclic carbonates and cyclic anhydrides as well as a manufacturing process thereof.

Nowadays, polymers are used in many types of products. Due to the widespread use of polymers, these are increasingly presenting an ecological problem since the majority of the worldwide 150 mill. tonnes of polymers produced annually is bioresistant, i.e. may not be biodegraded by naturally occurring processes. Possible solutions for reducing this problem of waste include incineration, recycling, pyrolysis or other chemical decomposition processes. However these sometimes have substantial disadvantages.

Another possibility of reducing the problem of waste is the development of polymers which are assimilated and biodegraded by naturally occurring processes. Therefore, melt-stable, aliphatic polyesters and/or copolyesters and, in particular, polyesters based on lactides are being increasingly considered as standard plastics, as they can compete with the original petrochemical polymers which are used in the form of packaging, paper coating, fibres, foams, films, etc..

However, high-molecular weight aliphatic polyesters which have been known about for a long time and can be manufactured from the ring-opening polymerisation of cyclic compounds such as 1,4-dioxane-2,6-dion (glycolide) and 3,5-dimethyl-1,4-dioxane-2,6-dion (lactide), are heat and moisture sensitive. This drawback has been used to manufacture therapeutic auxiliary agents in medicine and pharmacology, such as suture material, as this suture material may be easily biodegraded in the body. However, the manufacture of these high-molecular weight lactide polymers and copolymers with corresponding physical properties is extremely time-consuming and cost-intensive. The processes used to manufacture high-molecular weight lactide polymers and copolymers for medicine and pharmacology, such as the solvent extraction method, are therefore unsuitable for replacing petrochemical polymers.

In order to replace petrochemical polymers with biodegradable polymers, it is necessary to provide an appropriate, inexpensive and easy to manufacture polyester or copolyester as well as a corresponding process for manufacturing it in order to achieve an inexpensive, environmentally-friendly integrated production with high volumes of production.

It is well known that a large number of organo-metallic and metallic compounds accelerate the ring-opening polymerisation of lactides, lactones, cyclic anhydrides and cyclic carbonates. These organo-metallic and metallic compounds control the polymerisation rate, the degree of racemisation, the content of the residual monomer in the polymer obtained and the composition of the polymer. Unfortunately, these organo-metallic and metallic compounds also promote secondary reactions such as inter- and intra-molecular transesterification reactions in aliphatic polyesters and copolyesters. Such unfavourable secondary reactions may also occur during the subsequent thermal treatment and processing of the polymer which has been obtained. Through intramolecular transesterification reactions, gaseous decomposition products as well as monomers and cyclic oligomers are formed, due to which an increase of the molecular weight distribution, a reduction in the molecular weight, a limited conversion of monomers into polymers and polymer weight loss during heating occurs.

One possible way of avoiding transesterification reactions is to remove the catalyst by means of solvent extraction and the selective separation of the polymer. However, this technique is extremely cost-intensive, so it obviously cannot be used for replacing petrochemical polymers by aliphatic polyesters and/or copolyesters. Another possible way of avoiding any transesterification reactions is to add metal deactivators. However, these cannot prevent a reduction in molecular weight, which is why a combination of stabilisers and metal deactivators is used as a widespread alternative, with a reduction in the amount of metal-based initiation systems or catalysts. In this case, it is proving to be a definite drawback that the polymerisation time is extended to such an extent that the aliphatic polyester and/or copolyester has to be manufactured in a two-stage process, where in the first stage, prepolymerisation takes place in a reactor. In the second stage, polymerisation takes place during reactive extrusion, and the resulting polymer must be subsequently cleaned in order to remove any residual monomers.

Using systems based on rare earth metals or special alkoxide initiation systems, polymerisation could also be carried out in a one-stage process during reactive extrusion (WO 91/05001 and U.S. Pat. No. 5,292,859). Apart from the high cost of these special initiation systems, the polyesters, based on lactide and lactone, that are manufactured using this technique have a low thermal stability so that when processing the polymer which is obtained, a reduction in the molecular weight cannot be prevented, even by adding metal deactivators.

Polymerisation processes which involve extruders have already been proposed (EP 0 372 221), where the extrusion machines have not been operated using the prescribed process parameters but have only been used as a transportation unit. To date, only polymer/monomer mixtures which had to be refined during further stages of the process have been manufactured in this way.

The purpose of the present invention is to develop aliphatic polyesters and/or copolyesters which polymerise rapidly so that they may be manufactured in a one-stage process. An additional purpose of the present invention is to create a suitable process for manufacturing aliphatic polyesters and/or copolyesters according to the invention.

This is achieved with an aliphatic polyester and/or copolyester of the type described at the beginning using a reaction mixture in the polyreaction which contains at least one catalyst with the general formula

$$(M)(X1, X2 \ldots Xm)n \qquad (I)$$

where M is a metal, selected from group 3–12 of the periodic system and from the elements Al, Ga, In, Tl, Sn, Pb, Sb and Bi, (X1, X2 ... Xm) is a substituent, selected from one of the compound classes of alkyls, aryls, oxides, carboxylates, halogenides, alkoxides and compounds containing elements from group 15 and/or 16 of the periodic system, m is a whole number ranging from 1 to 6, and n is a whole number ranging from 0 to 6 and furthermore contains at least one co-catalyst with the general formula

$$(Y)(R1, R2 \ldots Rq)p \qquad (II)$$

where Y is an element selected from group 15 or 16 of the periodic system, (R1, R2 ... Rq) is a substituent, selected from one of the compound classes of alkyls, aryls, oxides, halogenides, oxyalkyls, aminoalkyls, thioalkyls, phenoxides, aminoaryls, thioaryls, q is a whole number ranging from 1 to 6, and p is a whole number ranging from 0 to 6.

One advantage of these aliphatic polyesters and/or copolyesters according to this invention is that they have a high polymerisation rate which enables them to be inexpensively manufactured in a one-stage process. In addition, another advantage is that the initiation system, which comprises the catalyst and co-catalyst, may remain in the polymer matrix without adding a special deactivator or having to perform an extraction.

What is preferable is if the molar ratio of the co-catalyst to the catalyst which is selected ranges from 100:1 to 1:100. In the case of a molar ratio such as this, the catalytic activity in the catalyst/co-catalyst system is sufficiently high for the kinetic requirements for manufacturing in a one-stage process aliphatic polyester and/or copolyester according to the invention.

In particular, the catalyst includes a compound which contains tin. Next to rare earth metal catalysts, tin catalysts have the highest polymerisation rate. Another advantage is that the catalyst includes in particular Sn-bis(2-ethylhexanoate) since this is available commercially at a low cost and in comparison to other tin compounds, it is not very sensitive to oxygen and humidity. It has also been approved by the FDA as a food additive which enables it to be used in packaging materials for foodstuffs.

Furthermore, the co-catalyst preferably includes a phosphorous compound, in particular $P(R_1, R_2, R_3)_3$ with $R_1, R_2, R_3$ having been selected from the aryls and alkyls class of compounds. These substantially increase the activity of the catalyst/co-catalyst system and consequently increase the polymerisation rate. In particular, $P(Ph)_3$ has been selected as a co-catalyst.

Preferably, the reaction mixture includes Sn-bis(2-ethylhexanoate) as a catalyst and as a co-catalyst $P(Ph)_3$. This catalyst/co-catalyst combination enables a high rate of polymerisation of polyester and/or co-polyester according to the invention.

What is particularly preferable is the 1:1 molar ratio of the Sn-bis(2-ethylhexanoate) catalyst to the $P(Ph)_3$ co-catalyst. With a molar ratio such as this, advantageously, quite considerable catalytic activity is evident as a result of which the polymerisation rate increases further and it is even more of an advantage to carry out a one-stage process in order to manufacture the polyester and co-polyester according to the invention.

In particular, the aliphatic polyester and/or copolyester according to the invention includes a stabiliser. To a large extent, this prevents radical chain termination reactions and also depolymerisation reactions both during the polymerisation process as well as during subsequent treatment during the melt. The stabiliser is either added to the aliphatic polyester and/or copolyester according to the invention following the polymerisation process or at the beginning of the polymerisation process, where the latterly mentioned alternative is preferable.

What is particularly preferable is that the stabiliser includes organophosphite and phenolic compounds or mixtures of these. Organophosphites and phenolic compounds or mixtures of these do not have a negative influence upon the kinetics of polymerisation. As a result of this, they do not lead to any reduction in the polymerisation rate which would have negative effects upon the feasibility of a one-stage process for manufacturing aliphatic polyester and copolyester according to the invention. Here, bis(2,4-di-t-butyl-phenyl)pentaerythritol diphosphite is preferably used as a stabiliser since this has also been approved by the FDA for contact with foodstuffs and therefore, the aliphatic polyester and/or copolyester according to the invention may also be used for packaging foodstuffs.

The stabiliser is preferably contained in a proportion which is less than two weight fractions for 20 weight fraction monomers, and it is particularly preferable if it is less than one weight fraction for 100 weight fraction monomers.

Furthermore, preferably a moderator should be contained in order to control the molecular weight. This is advantageous since the physical properties of aliphatic polyester and/or copolyester according to the invention like, for example, its modulus of elasticity, tensile strength, breaking strain, impact resistance and flexural modulus reach a maximum plateau at a specific average molecular weight. Therefore, by adding a moderator, the desired properties of the aliphatic polyester and/or copolyester according to the invention may be specifically adjusted and controlled.

It is preferable if the moderator is selected from phenols, alcohols, mono- or bivalent amines, thiols and multifunctional hydrogen compounds or multifunctional polymers formed from these categories of compounds. These may also be present as contaminants in the monomer, which is an advantage since that way, the required purity of the monomer used may be reduced to a defined extent, as a result of which expensive measures in order to purify the monomer may be avoided.

The aliphatic polyester and/or copolyester according to the invention preferably contains a filler and/or reinforcing agent. A filler and/or reinforcing agent which is provided with reactive end-groups to moderate the molecular weight of the aliphatic polyester and/or copolyester according to the invention is particularly preferable. As a result of this, this may make it possible to simply couple the filler and/or reinforcing agent to the polymer according to the invention. The fillers and/or reinforcing agents may be added both at the beginning, during as well as subsequent to polymerisation and worked in.

Furthermore, the aliphatic polyester and/or copolyester according to the invention is in particular characterised by the fact that the molecular weight lies between 30,000 and 300,000 g/mol, preferably between 80,000 and 200,000 g/mol and that the molecular weight distribution ratio Mw/Mn is<2.0. Within this preferable range with regard to the molecular weight, the aliphatic polyester and/or copolyester according to the invention has very good physical properties, for example, with regard to its modulus of elasticity and flexural modulus. Furthermore, the polymer viscosity and decomposition conditions as well as the choice of methods used to subsequently treat the polymer melt are influenced by the molecular weight ranges indicated.

In particular, the monomer fraction in the polymer amounts to less than 5% weight, preferably less than 2% weight. In this way, harmful influences upon the apparatus used during the subsequent treatment of the polymer melt may be avoided, for example, due to the adverse effects upon the apparatus caused by the free acids which are still present. Where necessary, the degassing of the reaction mixture is carried out in order to further reduce the residual monomer fraction.

The molar ratio between the monomer used or a mixture of monomers and the catalyst/co-catalyst mixture preferably amounts to at least 5000:1. Where a molar ratio such as this is selected, the negative effects of the catalysts used, and in particular, the transesterification reactions are reduced, where at the same time, the polymerisation rate is still sufficiently high to manufacture the aliphatic polyester and/or copolyester according to the invention during a one-stage process. Furthermore, in the case of such a molar ratio, the addition of metal deactivators is not necessarily required.

Furthermore, the monomer or a mixture of monomers preferably has a maximum free acid content of 10 mequ/kg and a maximum moisture content of 200 ppm. Therefore, no time-consumingly cleaned and as a result, expensive monomer is needed as an initial substance for the aliphatic polyester and/or copolyester according to the invention.

Furthermore, according to the invention, the present invention concerns a process for manufacturing aliphatic polyesters and/or copolyesters using an extrusion machine which is characterised by the fact that during a polyreaction, at least one monomer from the group comprising lactides, lactones, cyclic carbonates and cyclic anhydrides is converted;

during the polyreaction, a reaction mixture made from at least one catalyst of the general formula $$(M) (X1, X2 \ldots Xm)n, \qquad (I)$$

where M is a metal, selected from group 3–12 of the periodic system and from the elements Al, Ga, In, Ti, Sn, Pb, Sb and Bi, (X1, X2 . . . Xm) a substituent selected from one of the compound classes of alkyls, aryls, oxides, carboxylates, halogenides, alkoxides and compounds with elements from group 15 and/or 16 of the periodic system, m is a whole number ranging from 1 to 6, and n is a whole number ranging from 0 to 6 and furthermore at least one co-catalyst of the general formula $$(Y)(R1, R2 \ldots Rq)p \qquad (II)$$

is used where Y is an element, selected from group 15 or 16 of the periodic system, (R1, R2 . . . Rq) a substituent, selected from one of the compound classes of alkyls, aryls, oxides, halogenides, oxyalkyls, aminoalkyls, thioalkyls, phenoxides, aminoaryls, thioaryls, q is a whole number ranging from 1 to 6, and p is a whole number ranging from 0 to 6; and the process is a continuously carried out, one-stage, reactive extrusion process.

This process according to the invention for manufacturing aliphatic polyester and/or copolyester according to the invention is particularly advantageous since the aliphatic polyester and/or copolyester according to the invention is obtained in a one-stage and continuously effected extrusion process, which is extremely cost-effective with a very good yield and quality of the polymer product.

Furthermore, preferably at the oligomerisation stage, the thorough mixing and homogenisation of the mixture takes place and at the final polymerisation stage, a build-up of pressure with a thermal/mechanical input of energy.

By thoroughly mixing and homogenising the mixture at the oligomerisation stage, a high number of exchange processes are made possible in the extrusion machine, as a result of which the polymerisation rate increases. The build-up of pressure which occurs during the final polymerisation stage with a thermal/mechanical input of energy combined with the high number of exchange processes in the extrusion machine reduces the average residence time of the reaction mixture in the extrusion machine to such an extent that the polyreaction in essence is completed already within the extrusion machine. This facilitates the manufacturing of aliphatic polyester and/or copolyester according to the invention to a considerable extent, as a result of which the costs of the process according to the invention are substantially reduced.

Preferably the extrusion machine will be a closely intermeshing co-rotating twin-screw extrusion machine. This enables a high number of exchange processes and at the same time a build-up of pressure with a thermal/mechanical input of energy. Furthermore, what is also advantageous is that a twin-screw extrusion machine made of screws and cylinder parts is modularly constructed, as a result of which this enables a system for manufacturing aliphatic polyester and/or copolyester according to the invention to have the greatest possible flexibility to optimally adapt to the specific polymerisation conditions.

In particular, the temperature controllable sections of the extrusion machine have a temperature ranging between 100 and 230° C., preferably between 180 and 195° C. Higher temperatures result in the discoloration of the polymer end-product. Furthermore, within these temperature ranges, a limited molecular weight distribution ratio Mw/Mn of preferably<2.0 of the aliphatic polyester and/or copolyester according to the invention is obtained.

The process according to the invention is furthermore in particular characterised by the fact that during the first stage, the initial substances monomers and co-monomers, catalysts, co-catalysts, moderators, stabilisers, fillers and/or reinforcing agents are mixed;

during the second stage, this mixture is added to the extrusion machine;

during the third stage, the polymer obtained is continuously polymerised and discharged; and during the fourth stage, the polymer obtained is shaped.

The mixture is preferably added into the extrusion machine gravimetrically, however, this may also be effected volumetrically. Gravimetric feeding has the advantage that even irregularly shaped material may be added easily and constantly into the extrusion machine.

The polymer obtained is preferably hardened by cooling it after it has been discharged, where cooling preferably takes place via a conveyor belt using air.

The polymer which is obtained in this way is preferably shaped in a granulator into plastic granulate which is the form in which polymers are usually sold. However, the polymer obtained may also be manufactured for sale in other forms.

Furthermore, during the process according to the invention, the moderator, stabiliser, fillers and/or reinforcing agents are preferably added to the mixture separately. By doing so, this gives an opportunity to be able to exert a greater influence upon the polymer reaction. However, both the moderator as well as any further initial substances may be added individually, as well as the corresponding feeding points may also be arranged spatially separately from one another.

Furthermore it is proposed to determine the viscosity of the polymer by in-line or on-line measurement and/or to determine the monomer conversion by in-line or on-line infrared spectroscopic measuring. This data is preferably used to directly control the process parameters and/or to control the quantity of the moderator to be added.

Preferably the residual monomer fraction in the polymer may be reduced by a degassing unit in the extrusion machine. As a result of this, advantageously, the monomer fraction in the polymer may be further reduced.

These and other advantages of the aliphatic polyester and/or copolyester according to the invention and the process according to the invention which is used to manufacture it shall be shown in the following models and drawings.

EXAMPLE 1

Catalysts for aliphatic polyesters and/or copolyesters

Figure 1:
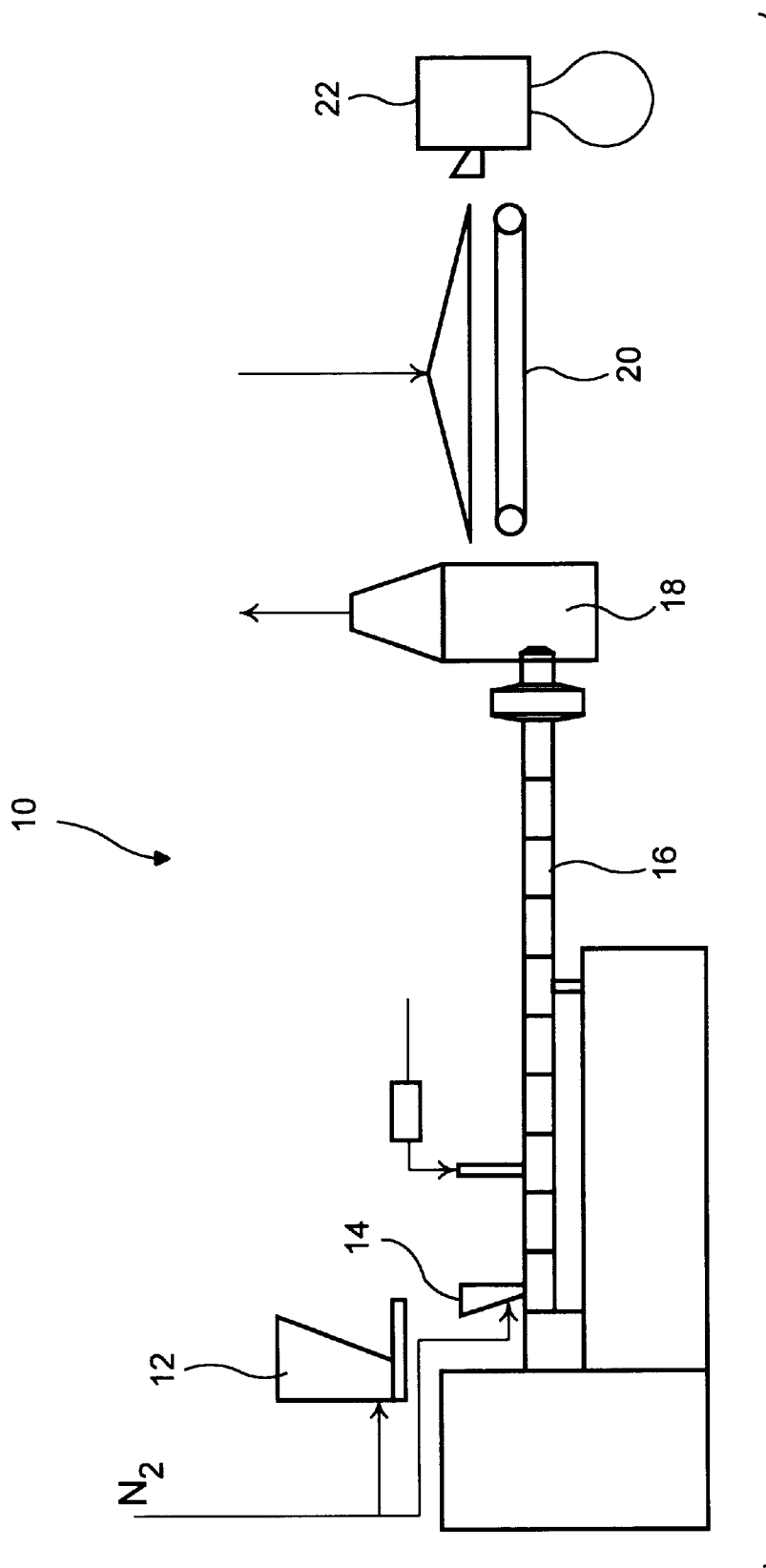
FIG. 1: a process design for manufacturing the aliphatic polyester and/or copolyester according to the invention.

Kinetic experiments have been carried out in order to ascertain the influence of various metal acetylacetonates (2,4-pentanedionato-0,0') as catalysts for the ring-opening polymerisation of lactide in the melt. In these experiments, the time-dependency of the molecular weight and the monomer conversion for a constant initial molecular monomer/metal ratio of 1000 at 180° C. was examined. The monomer conversion was determined by FTIR spectroscopy, where a calibration of the ratio of polylactide (PLA) to lactide (LA) ([PLA]/[LA]) to the ratio of A1323/A935 is used as a reference and the relative intensities of the monomer- and polymer methine groups was examined using 1HNMR spectroscopy in $CDCl^3$ at up to 25° C. The molecular weight of the polyactide was determined in $CHCl^3$ at 35° C. by using WATERS 610 liquid chromatography. The molecular weight and the molecular weight distribution was ascertained in relation to a polystyrene (PS) calibration and corrected to an absolute basis by using an universal calibration (KPS=1.67 ($10^{-4}$, aPS=0.692, KPLA=1.05($10^{-3}$, aPLA=0.563).

In all of the examples, the polymerisation was carried out in the manner described as follows.

The polymerisation took place in a 25 ml ampule which had been flame-treated beforehand and rinsed with nitrogen which was provided with a septum sealed inlet. For each kinetic experiment, at least 5 ampules were very rapidly filled with lactide in an air atmosphere. The ampules were evacuated and rinsed twice with nitrogen before the catalyst, dissolved in toluene or tetrahydrofuran, was added through the septum using injectors with needles made of stainless steel. The solvent was evaporated under reduced pressure, the ampules sealed and placed in a thermostatic oven. The ampules were taken out of the oven at specific times, cooled using cold water, the top was broken off and the content was dissolved in $CHCl_3$. The tin residues were extracted by successively washing the organic layer with an aqueous HCl solution (0.1 molar) and using deionised water twice. In order to determine the monomer conversion using FTIR spectroscopy, part of the solution was removed and evaporated in a KBr chamber and the remaining solution was poured into cold methanol. The polymer was recovered in this manner by precipitation and dried under a vacuum until it reached a constant weight.

Polylactide, manufactured using Sn(II) catalysts, polymerised the most rapidly compared to other compounds (Table 1).

TABLE 1

Influence of the catalyst metal-2,4-pentanedionato-0,0' upon the kinetics of L-lactide polymerisation in melt at 180° C. with an initial molar ratio between the monomer and metal of 1000:1.

| Metal cation | Colour in toluene | t90[h] (2) | t100 [h] (2) | Mn100 × $10^{-3}$ (3) | Mw/Mn (3) |
|---|---|---|---|---|---|
| Al (III) | colourless | 1.7 | 3 | 99 | 1.6 |
| Fe (II) | dark red | 1.2 | 1.6 | 102 | 1.6 |
| Zn (II) | colourless (5) | 0.9 | nd | 70 | 1.6 |
| Mn (II) | dark brown | 0.8 | 1.4 | 52 | 1.6 |
| Co (II) | pink (1) | 0.5 | 1.07 | 116 | 1.6 |
| Sn (II) | bright yellow | 0.2 | 0.25 | 255 | 1.5 |
| V (III) | dark brown | 6 | 22.75 | 34 | 1.8 |
| Cu (II) | blue (5) crimson | >24.00 | nd | nd | nd |
| Cr (III) | blue (5) crimson | " | " | " | " |

(1) in THF instead of toluene
(2) polymerisation time, to reach 90% or maximum monomer conversion (100%).
(3) Mw: mean molecular weight determined according to weight; Mn: mean molecular weight determined by number; and molecular weight distribution in case of a maximum monomer conversion Mn100, determined using SEC (Size Exclusion Chromatography) in $CHCl_3$.
(4) nd = not determined
(5) used as a solid

EXAMPLE 2

Lactide polymerisation, catalysed by Sn-bis(2-ethylhexanoate).

The kinetic tests were carried out in the melt. In addition, Sn-bis(2-ethylhexanoate) was used as a catalyst (Table 2). An increase in the initial molar ratio of L-lactide to Sn-bis (2-ethylhexanoate) reduces the polymerisation rate (Table 2: entries 1 to 3). The degree of conversion was ascertained using FTIR spectroscopy (reference is a lactide/polylactide calibration) and reaches a maximum plateau between 95% and >99% after 3 h for an initial molar ratio of L-lactide and Sn-bis(2-ethylhexanoate) ([L-LA]0[Sn]) of 100:1, after 17 h for a [L-LA]0/[Sn] ratio of 1000 and after 50 h, for a [L-LA]0/[Sn] ratio of 10,000:1. After 15 h, the molecular weight reaches a plateau at approximately 200,000 g/mol and increases again as the reaction time is extended. The molecular weight decreases as the catalyst fraction increases. An increase in the polymerisation temperature in the case of a constant initial molar monomer-Sn(II) ratio also increases the polymerisation rate. (Table 2, entries 4 to 7). In the overall temperature range, the molecular weight continues up to the maximum and again decreases during the subsequent period. Furthermore, the increase in the polymerisation temperature contributes towards lowering the maximum molecular weight achievable and reducing the maximum monomer conversion from 98% at 150° C. to 96% at 180° C.

TABLE 2

Influence of the initial molar ratio between the monomer and Sn-bis(2-ethylhexanoate) and the polymerisation temperature upon the kinetics of L-lactide polymerisation in the melt.

| Entry | (L-LA)0/[Sn] | T (° C.) | t90[h] (1) | t100(h) (1) | Mn100 × $10^{-3}$ (2) |
|---|---|---|---|---|---|
| 1 | 100 | 110 | 1.5 | 3.0 | 53 |
| 2 | 1000 | 110 | 10.0 | 17.0 | 220 |
| 3 | 10,000 | 110 | 22.0 | 50.0 | 304 |
| 4 | 1000 | 110 | 10.0 | 17.0 | 220 |
| 5 | 1000 | 130 | 4.2 | 10.0 | 175 |

TABLE 2-continued

Influence of the initial molar ratio between the monomer and Sn-bis(2-ethylhexanoate) and the polymerisation temperature upon the kinetics of L-lactide polymerisation in the melt.

| Entry | (L-LA)0/[Sn] | T (° C.) | t90[h] (1) | t100(h) (1) | Mn100 × $10^{-3}$ (2) |
|---|---|---|---|---|---|
| 6 | 1000 | 150 | 1.6 | 5.0 | 154 |
| 7 | 1000 | 180 | 0.2 | 0.55 | 87 |

(1) Polymerisation time to respectively reach 90% or maximum monomer conversion (theoretically 100%).
(2) Mean molecular weight in number, ascertained by SEC in $CHCl_3$.

EXAMPLE 3

Influence of triphenyl phosphine $P(Ph)_3$ as a co-catalyst upon the kinetics of L-lactide-polymerisation, catalysed by Sn-bis(2-ethylhexanoate).

In order to illustrate the effect of triphenyl phosphine $P(Ph)_3$ as a co-catalyst, $P(Ph)_3$ was added to Sn-bis(2-ethylhexanoate) in an equimolar ratio. At 130° C., for an initial molar ratio between L-lactide and the combination of Sn-bis(2-ethylhexanoate) and $P(Ph)_3$, the initiation as well as the progress of polymerisation are more rapid if $P(Ph)_3$ is present (Table 3). Above the value of 90% with regard to monomer conversion, no accelerating effect upon polymerisation in sealed glass ampules may be determined any longer. At a temperature of 180° C., this accelerating effect is still clear.

TABLE 3

Influence of triphenyl phosphine $P(Ph)_3$ as a co-catalyst upon L-lactide polymerisation, catalysed by Sn-bis(2-ethylhexanoate) at 130° C. and 180° C. ([a] $Sn(Oct)_2$, [b]$Sn(Oct)_2$ × $P(Ph)_3$).

| [L-LA]0/Polym. [Sn] | T[° C.] | t80 (2) (min) [a] | [b] | t90 (2) (min) [a] | [b] | t100 (2) (min) [a] | [b] | Mn × $10^{-3}$ (3) [a] | [b] |
|---|---|---|---|---|---|---|---|---|---|
| 1000(1) | 130 | 15 | 10 | 24 | 18 | <120 | <120 | 45 | 68 |
| 1000 | 180 | — | — | 15 | 10 | 35 | 18 | 85 | 90 |
| 5000 | 180 | — | — | 27 | 20 | 60 | 45 | 102 | 153 |
| 10,000 | 180 | — | — | 48 | 36 | 150 | 120 | 128 | 259 |

(1) 1.44 equivalents of 2-ethylhexene-1-ol per mole of Sn-bis(2-ethylhexanoate) added.
(2) Polymerisation time to reach 80%, 90% or maximum monomer conversion (100%).
(3) Mean molecular weight in number, determined using SEC in CHCl3.

EXAMPLE 4

Influence of the catalyst/co-catalyst concentration upon the kinetics of L-lactide polymerisation.

The kinetic experiments were carried out in sealed glass ampules at 180° C., where various initial molar ratios (R) of L-lactide versus the combination Sn-bis(2-ethylhexanoate)-triphenyl phosphine were used. The time required to reach the maximum monomer conversion t100 increases with an increase of (R) from 100 to 10,000. Thus, t100=15 mins for R=1000, t100=45 mins for R=5000 and t100=120 mins for R=10,000.

EXAMPLE 5

Influence of the molar ratio (m) from the catalyst to the co-catalyst on the polymerisation kinetics of L-lactide Table 4 shows the dependency of the mean molecular weight in number of polylactide and the monomer conversion of (m), which is defined as [Sn-bis(2-ethylhexanoate)]/$(Ph)_3$], for an initial molar ratio between L-lactide and Sn-bis(2-ethylhexanoate) of 5000:1 and a reaction time of 10 or 25 mins An increase in the ratio (m) of over 1 does not have any positive influence upon the polymerisation rate of L-lactide.

TABLE 4

Influence of the initial molar ratio (m) between triphenyl phosphine and Sn-bis(2-ethylhexanoate) upon the polymerisation of L-lactide at a temperature of 180° C. and a [L-La]$_0$/[Sn] ratio of 5000:1.

| m | Polym. time [mins] | Conversion [%] (1) | Mn × $10^{-3}$ (2) | Mw/Mn (2) |
|---|---|---|---|---|
| 0.1 | 25 | 35 | 86 | 2.0 |
| 1.0 | 10 | 36 | 41 | 1.7 |
| 1.0 | 25 | 82 | 78 | 1.8 |
| 2.0 | 25 | 77 | 77 | 1.9 |
| 5.0 | 10 | 20 | 33 | 1.6 |
| 10.0 | 10 | 20 | 26 | 1.7 |
| 10.0 | 25 | 80 | 78 | 1.8 |

(1) determined by gravimetry after precipitating the polymer in cold methanol.
(2) determined by SEC in THF in comparison to a polystyrene calibration, calculated to an absolute basis by using universal calibration (KPS = 1/25 (10-2, aPS = 0.717, KPLA = 5.49(10-2, aPLA = 0.639).

In contrast to this, in the case of an increase in (m), a reduction of the possible molecular weight and the possible monomer conversion is observed. If the ratio of triphenyl phosphine to tin is reduced to below 1, then the polymerisation rate drastically decreases.

EXAMPLE 6

Dependency of polymer degradation on the composition of the catalyst.

Thermogravimetric measurements were taken using poly-(L-lactides) which had been polymerised using various combinations of catalysts with an initial molar ratio between the catalyst and monomer of 1000 and a polymerisation temperature of 180° C. (Table 5). In addition to this, a TGA TA51 analysis device was used under a stream of air (heating rate=10K/min or isothermal temperature=210° C.).

TABLE 5

Influence of the catalyst composition upon thermal stability (polymerisation conditions: $[L-La]_0/[metal] = 1000$ at 180° C.; acac: acetylacetonate; Oct: 2-ethylhexanoate).

| Catalyst | Polym. time [h] | Mn $10^{-3}$ (1) | Mw/Mn (1) | Max. decomp. (2) temp. [° C.] | Weight loss [weight % min$^{-1}$ 10$^3$] (3) |
|---|---|---|---|---|---|
| Al (acac)3 | 3.0 | 103 | 1.6 | 364 | 45 |
| Fe (acac)2 | 1.5 | 83 | 1.7 | 357 | 60 |
| Mn (acac)2 | 1.5 | 43 | 1.6 | 363 | 85 |
| Co (acac)2 | 1.2 | 60 | 2.0 | 353 | nd (4) |
| Sn (Oct)2 | 1.0 | 87 | 2.0 | 290 | 260 |
| Sn (acac)2 | 0.5 | 127 | 1.6 | 309 | 560 |
| Sn (Oct)2 (P(Ph)3 | 0.25 | 120 | 1.7 | 297 | 1070 |

(1) Mean molecular weight in number and molecular weight distribution, determined using SEC in $CHCl_3$.
(2) Maximum decomposition temperature, determined using TGA from the turning point in the function of the temperature versus weight loss in an air atmosphere (heating rate = 10K/min).
(3) Loss in weight, determined using TGA from the slope in the linear part of the time-dependent weight loss function at 210° C. in an air atmosphere.
(4) nd = not determined.

The occurrence of depolymerisation reactions increases with the increasing reactivity of the catalyst system with regard to ring-opening polymerisation (cp. examples 1 to 3).

EXAMPLE 7

Dependency of the decomposition rate of poly(L-lactide) upon the initial molar ratio between the monomer and the equimolar complex Sn-bis(2-ethylhexanoate) triphenyl phosphine.

The thermal stability of poly(L-lactide) was examined as a function of the initial molar ratio (R) of the monomer to the Sn-bis(2-ethylhexanoate)triphenyl phosphine complex (Table 6). As the molar ratio of the monomer to the catalyst/co-catalyst complex increases, the corresponding polyesters are more stable.

TABLE 6

Dependency of the thermal stability of poly(L-lactide) upon the initial molar ratio between the monomer and the Sn-bis(2-ethylhexanoate) triphenyl phosphine complex (polymerisation temperature 180° C.).

| R | Polym. t (mins) | MDT (° C.) (1) | Weight loss (Weight % mins$^{-1}$ – 10$^3$) (2) |
|---|---|---|---|
| 1000 | 18 | 257 | 1070 |
| 5000 | 45 | 317 | 180 |
| 7500 | 60 | 345 | 90 |
| 10,000 | 120 | 357 | 50 |

(1) MDT = maximum decomposition temperature, defined by the turning point in the temperature-dependent weight loss function at a heating rate of 10K/min in an air atmosphere.
(2) Determined from an TGA isotherme as the slope of the linear range of the time-dependent weight loss function at 210° C. in an air atmosphere.

EXAMPLE 8

Influence of various stabilisers upon the thermal stability of polylactides which contain Sn-bis(2-ethylhexanoate) triphenyl phosphine.

IRGANOX MD 1010 from Ciba Geigy (tetrakis (methylene 3-(3', 5'-di-t-butyl-4'-hydroxy(phenyl) proprionate)methane), ULTRANOX from GE Speciality Chemicals (Bis(2,4-di-t-butylphenyl)pentaerythritol diphosphite) and mixtures of both of these were used as stabilisers and/or metal deactivators. In addition, the hydroxyl chain end-groups were also altered by esterification. An amorphous poly(L,L-lactide-co-meso-lactide) stereocopolymer (92:8), which includes an equimolar Sn-bis (2-ethylhexanoate)/triphenyl phosphine complex with [La]$_0$/[Sn]=5000 as a catalyst, was modified in a solution, i.e. esterified or mixed with stabilisers and/or deactivators and dried at 60° C. at a reduced pressure for 24 hours. Polymerisation was carried out in the melt at 180° C. Thermogravimetric tests were carried out using a TGA TA51 analyser under a constant stream of air at a heating rate of 10 K/min and at an isothermal temperature of 210° C.

Table 7 represents the thermal stability of polylactide depending on the modifications made. With the exception of entry 5, a one-stage thermal decomposition is observed. The acetylisation and esterification of the hydroxyl end-groups of polylactide by amber acid anhydride do not bring about any substantial increase in thermal stability (entries 2 and 3). Nor are IRGANOX and IRGANOX-rich stabiliser mixtures effective for this polylactide. On the other hand, the rate of degradation decreases to an acceptable level with ULTRANOX as the main fraction in a stabiliser mixture (weight loss<17% min$^{-1}$×10$^3$ or 1% during the first hour). ULTRANOX does not disturb lactide polymerisation, which is catalysed by Sn(II) based catalysts. Therefore, ULTRANOX may even be added at the start of ring-opening polymerisation (cp. example 9).

TABLE 7

TGA measurements of modified polylactides which contain an equimolar Sn-bis(2-ethylhexanoate)/triphenyl phosphine complex with an initial molar monomer/tin ratio of 5000:1.

| entry | Change | MDT (° C.) (1) | T95 (° C.) (2) | Weight loss (Weight % min$^{-1}$ 10$^3$] (3) |
|---|---|---|---|---|
| 1 | none | 350 | 283 | 50 |
| 2 | PLA-O—CO—(CH2)2-COOH | 325 | 282 | 50 |
| 3 | PLA-O—CO—CH3 | 343 | 292 | 15 |
| 4 | 1% IRGANOX | 362 | 286 | 30 |
| 5 | 0.75% IRGANOX 0.25% ULTRANOX | 295 and 374 | 294 | 35 |
| 6 | 0.58% IRGANOX 0.5% ULTRANOX | 374 | 344 | 20 |
| 7 | 0.25% IRGANOX 0.75% ULTRANOX | 370 | 339 | 10 |
| 8 | 1% ULTRANOX | 366 | 334 | 10 |

(1) MDT = maximum decomposition temperature, defined by the turning point in the temperature-dependent weight loss at a heating rate of 10 K/min in an air atmosphere.
(2) T95 = temperature which corresponds to a weight loss of 5% weight on the temperature-dependent weight loss curve at a heating rate of 10 K/min in an air atmosphere.
(3) With the aid of a TGA isothermal line, determined by the slope of the linear part of the time-dependent weight loss curve at 210° C. in an air atmosphere.

EXAMPLE 9

Influence of ULTRANOX upon polymerisation kinetics and the thermal stability of polylactide, manufactured using Sn-bis(2-ethylhexanoate).

The kinetic tests were carried out in sealed glass ampules at 180° C. with an initial molar monomer/Sn-bis(2-ethylhexanoate) ratio of 1000 and 1% weight of ULTRANOX. Maximum monomer degrees of conversion and molecular weights are reached after 55 minutes, where these are not dependent upon the addition of ULTRANOX to Sn-bis(2-ethylhexanoate). In order to determine the effectiveness of ULTRANOX as a stabiliser, thermogravimetric measurements were taken using poly(L-lactide) samples containing various quantities of ULTRANOX and were polymerised with an initial molar monomer/tin ratio of 1000:1. In the presence of such large quantities of Sn(II) catalyst, the addition of larger quantities of ULTRANOX cannot prevent the occurrence of transesterification reactions (Table 8).

TABLE 8

Influence of the ULTRANOX content upon the thermal stability of polylactide (polymerisation conditions: [L-La]$_0$/[Sn] = 1000 at 180° C. for 1 h)

| Proportion of ULTRANOX [%] | T1 (° C.) (1) | T2 (° C.) (1) | Weight loss after 1 h (% weight) (2) |
|---|---|---|---|
| 0.0 | 290 | — | 17 |
| 0.25 | 290 | — | 37 |
| 0.5 | 274 | 359 | 41 |
| 1.0 | 283 | 366 | 58 |

(1) T1, T2 = turning points in the temperature-dependent weight loss curve at a heating rate of 10 K/min in an air atmosphere.
(2) Weight loss after 1 h, determined using TGA at an isothermal temperature of 210° C. in an air atmosphere.

Where the proportion of ULTRANOX was less than 0.25%, a one-stage weight loss was observed. In the case of higher ULTRANOX proportions, the thermogravimetric measurement is characterised by a two-stage weight loss. A clear shift in both turning points was observed upon increasing the quantity of ULTRANOX. Increasing the proportion of ULTRANOX increases the polymer weight loss, here expressed as weight loss after 1 hour. Based on the kinetic requirements of a one-stage polymerisation process and the necessity for the sufficient melt stability of the resulting polymers, no balance between the catalytic activity of Sn-bis (2-ethylhexanoate) is found compared with polymerisation and depolymerisation.

EXAMPLE 10

Influence of the moderators 2-ethylhexanoate and hexane acid upon the lactide polymerisation process Various quantities of the moderators 2-ethylhexanoate (Oct) and hexane acid (HA) which, prior to this, had been dried for 48 h over BaO and for 48 h over MgSo$_4$ were added to a mixture of L-lactide and an equimolar Sn-bis(2-ethylhexanoate)/triphenyl phosphine complex with an initial molar monomer/tin ratio of 5000:1. The polymerisations were carried out while agitating these in a sealed glass ampule at 180° C. for 1.77 h. The monomer conversion and the molecular parameters of the polymers which arise are shown in Table 9.

TABLE 9

Dependency of the lactide polymerisation process upon the addition of an alcohol (Oct) and a carboxyl acid (HA) as a moderator. (Sn(Oct)$_2$ × P(Ph3) as a catalyst with [L-LA]$_0$/[Sn] = 5000:1 at 180° C. for 1.77 h).

| Additive | [Add]$_0$/[Sn] | Mn × 10$^{-3}$ (1) | Mw/Mn (1) | Conversion [% weight] (2) |
|---|---|---|---|---|
| Oct | 1 | 174 | 1.5 | 100 |
|  | 2 | 162 | 1.5 | 99 |
|  | 5 | 123 | 1.6 | 99 |
|  | 10 | 103 | 1.6 | 99 |
| HS | 1 | 99 | 1.8 | 100 |
|  | 2 | 95 | 1.8 | 98 |
|  | 5 | 84 | 1.9 | 89 |
|  | 10 | 90 | 1.7 | 75 |

TABLE 9-continued

Dependency of the lactide polymerisation process upon the addition of an alcohol (Oct) and a carboxyl acid (HA) as a moderator. (Sn(Oct)$_2$ × P(Ph3) as a catalyst with [L-LA]$_0$/[Sn] = 5000:1 at 180° C. for 1.77 h).

| Additive | [Add]$_0$/[Sn] | Mn × 10$^{-3}$ (1) | Mw/Mn (1) | Conversion [% weight] (2) |
|---|---|---|---|---|

(1) determined using SEC in CHCl$_3$.
(2) determined using FTIR spectroscopy in relation to a monomer/polymer calibration.

If a primary alcohol is added to the reaction medium, it acts as an initiator for L-lactide polymerisation. If increasing volume percentages of hexane acid are added to the reactive mixture, the monomer conversion is drastically reduced over a constant reaction time while the molecular weight distribution is only slightly influenced.

EXAMPLE 11

Required monomer purity

The influence of monomer purity upon the molecular weight of the polylactide obtained and upon the kinetics of polymerisation has been examined. The polymerisation was effected in sealed glass ampules at 180° C. for an initial molar ratio of monomer to Sn-bis(2-ethylhexanoate)/triphenyl phosphine complex of 5000:1 and various lactide purities. The purity of the lactide was determined by potentiometric titration. Where there is a decrease in lactide purity, the molecular weight is reduced and the polymerisation time is slightly reduced. For example, the molecular weight reaches 245,000 g/mol with a residual acid content of 2 mequ/kg and 79,000 g/mol with an acid content of 16 mequ/kg.

EXAMPLE 12

Time and temperature dependency of the molecular parameters of the polymers obtained.

Table 10 shows the time dependency of the molecular weight and the molecular weight distribution when an amorphous poly(L,L-lactide-co-meso-lactide) stereocopolymer (92:8) is heated up to various temperatures in an air atmosphere. The molecular weight parameters were ascertained using SEC in CHCl3, in relation to a polystyrene calibration and corrected to an absolute basis by using universal calibration. The measurements were taken from polymerised samples, which contained 1% weight ULTRANOX and an equimolar Sn-bis(2-ethylhexanoate)/triphenyl phosphine complex with an initial molar ratio between the monomer and tin of 5000:1. When an increase in temperature occurs, the molecular weight loss and molecular weight distribution slightly increase during the same heating time. No formation of cyclic oligomers was able to be determined during a heating time of 1 h.

TABLE 10

Time and temperature dependency of the molecular weight of an amorphous polymerised polylactide (polymer composition: poly(L,L-La-co-meso-La) (92:8), [La]$_0$/[Sn] = 5000, catalyst Sn(Oct)$_2$ × P(Ph)$_3$, 1% weight ULTRANOX).

| Temperature T [° C.] | Time t [min] | 100 × Mn(t)/Mn(t0) | Mw/Mn |
|---|---|---|---|
| 180 | 15 | 96 | 2.0 |
|  | 30 | 80 | 2.3 |
|  | 60 | 77 | 2.4 |
| 190 | 15 | 86 | 2.3 |

TABLE 10-continued

Time and temperature dependency of the molecular weight of an amorphous polymerised polylactide (polymer composition: poly(L,L-La-co-meso-La) (92:8), [La]$_0$/[Sn] = 5000, catalyst Sn(Oct)$_2$ × P(Ph)$_3$, 1% weight ULTRANOX).

| Temperature T [° C.] | Time t [min] | 100 × Mn(t)/ Mn(t0) | Mw/Mn |
|---|---|---|---|
|  | 30 | 79 | 2.5 |
|  | 60 | 75 | 2.5 |
| 210 | 15 | 84 | 2.2 |
|  | 30 | 77 | 2.4 |
|  | 60 | 70 | 2.6 |

EXAMPLE 13

Thermal and physical properties of some L-lactide copolymers.

Table 11 shows the thermal and physical properties of some typical lactide-based polymers. Lactide stereocopolymers were manufactured by polymerisation using an equimolar Sn-bis(2-ethylhexanoate)/triphenyl phosphine complex at 180° C. in sealed glass ampules for an initial molar ratio between the monomer and tin of 1000:1 and a reactive time of 0.5 h while being constantly stirred. The copolymerisation of L-lactide and (-caprolactone was accordingly effected for a monomer/tin ratio of 5000:1 and a polymerisation time of 4 h. After the tin residues had been removed by solvent extraction (cp. Example 1), the samples were melted and compression moulded for 5 mins at a pressure of 15 bars, at 190° C. in the case of semi-crystalline, and at 170° C. in the case of amorphous lactide-based polymers, into 2 mm thick plates. The mechanical properties were ascertained using a tension test according to ASTM D-638 at room temperature using a ADAMEL LMOM-ARGY DY-24 device (test rate of 20 mm/min). The calorimetric measurements were determined on an DSC/ATD DuPont 9000 device under a constant stream of nitrogen (heating rate=20 K/min, the 2nd heating curve was determined following rapid cooling).

(L-lactide) in a closely intermeshing co-rotating twin-screw extruder (polymerisation conditions [L-La]$_0$/[Sn]=5000, Sn(Oct)$_2$×P(Ph)$_3$ (1:1) as a catalyst).

Below, a diagram of the process engineering system (10) as shown in FIG. 1 will be described for continuous polymerisation by way of the one-stage reactive extrusion of poly(L-lactide). A closely intermeshing co-rotating twin-screw extruder (16) made by Berstorff (ZE 25) was selected as the extrusion machine. In preparation, 2 kg of L-lactide was poured into a large glass flask which, prior to this, had been flame-treated and into which nitrogen had been poured twice. With the aid of an injector with a needle made of stainless steel, the catalyst/co-catalyst system which had been dissolved in toluene was added, via a rubber septum, which seals the glass flask, to the L-lactide. By being continuously shaken, the toluene was then evaporated at a reduced pressure and the catalyst/co-catalyst system was evenly distributed in the L-lactide. This mixture, prepared beforehand in this way, was used as an initial basis for reactive extrusion. The prepared monomer catalyst/co-catalyst mixture is fed in a gravimetric feeder 12 equipped with a powder screw which is rinsed with nitrogen from below in a counter flow in order to avoid the monomer coming into unnecessary contact with the humid air. 700 g/h was chosen as the throughput for the polymerisation, i.e. the gravimetric feeder releases 700 g/h of the monomer catalyst/co-catalyst mixture into the entrance section 14 of the twin-screw extruder 16. This entrance section is also rinsed with dried nitrogen from below in the counter flow.

Figure 2:
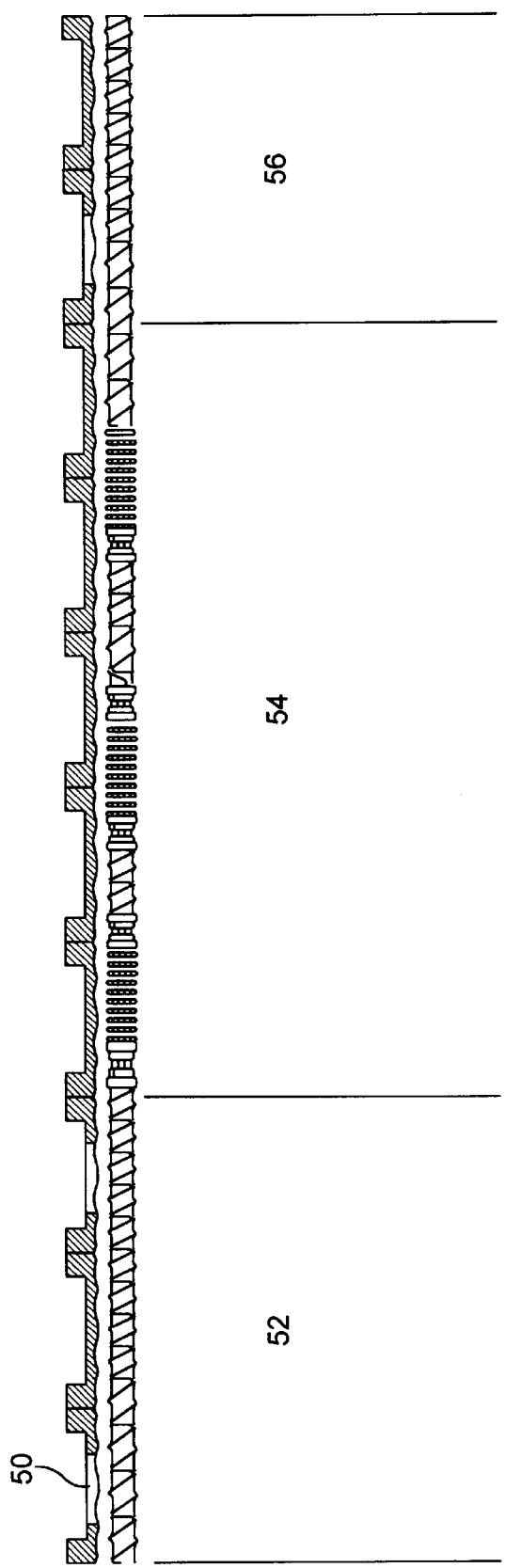
FIG. 2: a screw design for the twin-screw extruder for manufacturing the aliphatic polyester and/or copolyester according to the invention using a direction of output flow from left to right (52 to 56 accordingly)

FIG. 2 shows the screw design which was used in this example. The twin-screw extruder 16 used had a screw diameter of 25 mm and a length/diameter ratio of 48 and as such is one of the longer twin-screw extruders, which are due to their length preferable used for reactive modifications and also for the polymerisation which is being strived for. The twin-screw extruder 16 has both a modularly constructed screw and is modularly built up of several housings 50. The first two housings of the screw which rotates at 100 revolutions/minute are not heated, with the result that the solid monomers in the elements are drawn relatively rapidly into the machine at wide screw angles. The third housing is

TABLE 11

Influence of copolymerisation upon the thermal and physical properties of some L-lactide copolymers (PLA$_X$C$_Y$: X = % weight of the L-lactic acid units, C = co-monomer and Y = % weight of the co-monomer units).

| Copolymer | [1] Tg[° C.] | [2] Tm[° C.] | ΔH[J/g] | Mn × 10$^{-1(1)}$ | [3] Mw/Mn | [4] τ$_y$[Mpa] | [5] τ$_b$[Mpa] | [6] ε$_y$[%] | [7] ε$_b$[%] |
|---|---|---|---|---|---|---|---|---|---|
| PLA100 | 65 | 182 | 22.5 | 270 | 1.9 | — | 7 | — | 4.7 |
| PLA92.5 | 62 | — | — | 261 | 2.0 | 72 | 6 | 3.5 | 4.7 |
| PLA98.2CL1.8 | 62 | 164 | 2.0 | 112 | 1.8 | — | 69 | — | 4.3 |
| PLA94.3CL5.7 | 57 | 154 | 0.2 | 177 | 1.5 | 69.5 | 64.0 | 4.6 | 4.9 |
| PLA86.9CL13.1 | 46 | — | — | 138 | 1.8 | 62.4 | 56 | 3.5 | 4.5 |
| PLA78.5CL21.5 | 36 | — | — | 153 | 1.7 | 25.4 | 33.8 | 4.0 | 303.0 |
| PLA71.5CL28.5 | 16 | — | — | 135 | 1.8 | — | 39.2 | — | 922.0 |

[1] glass transition temperature
[2] melt temperature
[3] the molecular weight and molecular weight distribution were determined using SEC in CHCl$_3$ with a polystyrene calibration.
[4] yield stress
[5] stress at break
[6] elongation at yield τ$_y$
[7] elongation at break τ$_b$

EXAMPLE 14

Process according to the invention for continuous polymerisation by way of the one-stage reactive extrusion of poly used at narrower screw angles and at a higher temperature to melt the initial substances. In this area 52 of the twin-screw extruder, no noteworthy reaction takes place since the temperature is still not sufficient for rapid polymerisation. From the fourth housing up to the end of the extrusion machine which is aligned towards the degassing unit 18, this is heated up to a housing temperature of 180° C. The initial substances in the inside of the machine will not be at this temperature but rather a range of temperatures will prevail there which lie within a range in which acceptable polymerisation conditions exist. In the now following screw area 54 pre-polymerisation takes place. Three combinations of shearing- and mixing elements have been mounted for this purpose. Each of these combinations begins with a kneading block which improves the thermal polymerisation conditions by way of a thermal/mechanical input of energy. The following toothed disks work like knives which cut against each other and the effect of this is that the flow of material keeps being separated into new partial flows and consequently new adjacent formations are created in the polymer melt. These combinations of shearing and mixing are respectively closed against the flow. The further advanced the polymerisation is, the more vigorously the closure is selected—at first using a counter-feeding kneading block, then with a combination of a counter-feeding kneading block and counter-feeding screw element and finally, by a blister element which attains the strongest counterhold. The purpose of these melt buffers is to keep the material in the mixing elements for as long as possible, to increase the degree of fill in these and at the same time improve the mixing effect. As polymerisation progresses, the melt becomes more viscous, and homogeneous thorough mixing becomes all the more important for the polymerisation process since the potential partners for polymerisation become more scarce. Therefore, the counter feeding elements in each shear and mixing combination are enhanced in order to achieve a better mixing effect.

After a final release of pressure, the pressure is built up in order to overcome the die resistance. In the screw area 56, elements are arranged at flatter screw angles and with a greater channel volume. However, a build-up of pressure is only possible if the material contained has considerable viscosity. Here at the end of the screw, a equilibrium is adjusted, which largely depends upon the die resistance. Here, final polymerisation takes place under pressure (30 to 150 bars) and with a thermal/mechanical input of energy, ideally up to the thermodynamic equilibrium. In this connection, it should be noted that this thermodynamic equilibrium due to the increased pressure and the thermal/ mechanical input of energy is not necessarily the same as during a test using the same initial conditions in a glass ampule. The finished polymer is extruded through a circular die and the remaining monomer may, where the monomer content is still above 1% of the weight, be released using the connecting degassing unit 18 from the polymer at a low pressure. The high-viscosity polymer shaped in this way, which is still a melted liquid, is cooled on a conveyor belt 20 by way of air cooling and granulated in a connecting granulator 22 and is bagged for further processing. In Table 12, two poly(L-lactides) are placed next to each other by way of a comparison. One of them (Table 12, entry 2) is polymerised according to the above-described process engineering technique with a housing temperature of 180° C. while the other (Table 12, entry 1) is polymerised at 180° C. according to example 1 in the glass ampule.

TABLE 12

Comparison between a Poly-L-lactide produced in a closely intermeshing co-rotating twin-screw extruder during reactive extrusion and a Poly-L-lactide produced in the glass ampule with an equimolar $Sn(Oct)_2 \times P(Ph)_3$ complex in the ratio $[L\text{-}La]_0/[Sn] = 5000$ poly(L-lactide) at 180° C.

| Entry | Process | Mn × $10^{-3}$ (1) | Mw/Mn (1) | Conversion [%] (2) | Time (mins) for |
|---|---|---|---|---|---|
| 1 | glass ampule | 246 | 1.9 | 98.5 | 40 mins |
| 2 | reactive extrusion | 91.1 | 1.8 | 99 | <7 mins (3) |

(1) Mean molecular weight in number and molecular weight distribution, determined using SEC in CHCl3 at 35° C. relative to a PS calibration.
(2) The monomer conversion was ascertained using FTIR spectroscopy.
(3) Estimated from a maximum residence time in the extrusion machine.

It is not really possible to compare two polymers manufactured in such different ways since, although the same initial conditions have been chosen, the purity in an extruder never reaches that of a glass ampule. This leads to a substantial reduction in the molecular weight obtained. At almost the same monomer conversion, the time which was needed for the complete conversion in a glass ampule was 40 minutes whilst during reactive extrusion it was reduced by more than a factor of 5. This is largely attributable to homogeneous thorough mixing during the polymerisation process but also to the input of thermal/mechanical energy into the material.

EXAMPLE 15

Continuous polymerisation by way of the one-stage reactive extrusion of melt-stable poly(L-lactides) in a closely intermeshing co-rotating twin-screw extruder.

The polymerisation and process engineering conditions correspond to those in Example 14. However, 1% weight ULTRANOX as a stabiliser is then added to the mixture of L-lactide and the equimolar Sn-bis(2-ethylhexanoate)/ triphenyl phosphine complex ([L=La]0/[Sn]=5000). The throughput amounts to 700 g/h, the housing temperatures 180° C. and the screw speed 100 revs/min. In Table 13, the results of the analysis of a melt-stable polymer produced in this way are compared with those of the non-stabilised polymer produced in Example 14.

TABLE 13

Comparison of during reactive extrusion polymerised poly(L-lactides) with and without a stabiliser. (Polymerisation conditions: Sn(Oct)2 P(Ph)3 in the ratio [L-La]0/[Sn] = 5000, 180° C. housing temperature, 100 revs/min screw speed).

| Stabiliser | Mn($10^{-3}$) (1) | Mw/Mn (1) | Conversion [%] (2) |
|---|---|---|---|
| none | 91.1 | 1.8 | 99 |
| 1% weight ULTRANOX | 100.4 | 1.6 | 99 |

(1) The mean molecular weight in number and molecular weight distribution were ascertained using SEC in CHCl3 at 35° C. relative to a PS calibration.
(2) The monomer conversion was ascertained using FTIR spectroscopy.

The most striking feature of the melt-stable polymer obtained using 1% weight ULTRANOX is the significantly less distinct and brighter colouring which indicates substantially less depolymerisation reactions. Both the stabilised as well as the non-stabilised polymer indicate 99% monomer conversion, i.e. the polymerisation is concluded and the degassing of the polymer obtained is no longer necessary. The stabilised polymer has a higher mean molecular weight in number and a smaller molecular weight distribution, i.e. without a stabiliser, increasingly often intermolecular transesterification reactions already take place in the extrusion machine which are substantially reduced by adding 1% weight ULTRANOX.

EXAMPLE 17

Process engineering concept for determining the in-line rheometric viscosity of a polymerised polymer from one-stage reactive extrusion and controlling polymerisation by changing the die resistance and/or the quantity of moderators added which influence the molecular weight.

Figure 3:
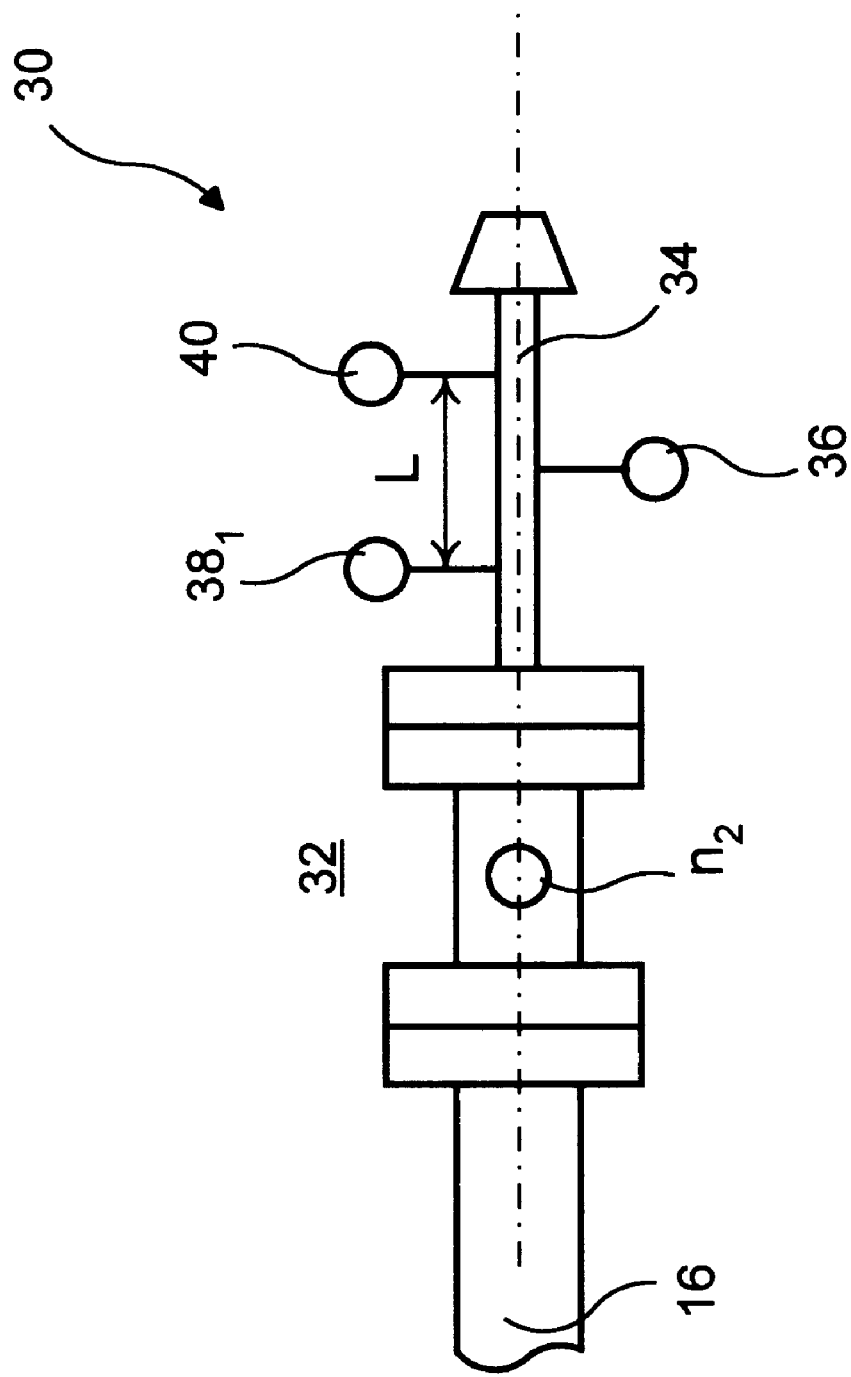
FIG. 3: a measuring die and control unit which completes the twin-screw extruder.

The die which completes the twin-screw extruder in Example 14 is replaced by a control combination. FIG. 3 shows therefore the die area 30 of the twin-screw extruder 16 which is used. Following this example, the polymer comes out of the twin-screw extruder 16 into a gear pump 32, the speed of which may be continuously adjusted using a potentiometer. In a stationary state, this has the same polymer throughput rate as the twin-screw extruder 16. After the gear pump, there is a flat-slit capillary die 34 with a temperature sensor 36 near to the melt or directly in the melt as well as two pressure gauge-tapping points 38 and 40. Via these pressure gauge-tapping points, the fall in pressure may be determined along the capillary die 34 and at the same time, the wall shearing stress (W according to Equation 1.

$$\tau_W = h/2 \ (P1-P2)/L \tag{Equation 1}$$

where $\tau_W$=wall shearing stress [Pa]

h=height of the flat-slit capillary die[mm]

P1, P2=pressure at the gauge-tapping points 38 and 40 [Pa]

L=distance between the gauge-tapping points 38 and 40 [mm]

The inherent shear rate (in the flat-slit capillary die may be calculated from the known polymer throughput rate and the geometrical data on the flat-slit capillary die 34 according to Equation 2.

$$\gamma app = (6(Cz \ (nz)/(b(h^2)) \tag{Equation 2}$$

where $\gamma app$=shear rate within the flat-slit capillary die 34 [s$^{-1}$]

Cz=output volume of the gear pump 32 per revolution [cm$^3$/rev]

nz=speed of the gear pump 32 [revs/s]

b=width of the capillary dies 34 [mm]

h=height of the flat-slit capillary die 34 [mm]

Due to the shear rate and the shearing stress, at a certain temperature, a polymer with a certain viscosity may be distinguished. As a result, the polymerisation process may be controlled by knowing the molecular weight and the molecular weight distribution.

If for example, due to interference within the process, whether this is due to slight differences in temperature or slight monomer fluctuations, a reduction occurs in the molecular weight and at the same time, the viscosity, then this is expressed by a decreased loss of pressure between the pressure gauge-tapping points 38 and 40 of the flat-slit capillary die 34. Using this signal, the rotation speed nz of the gear pump 32 is then controlled and also slightly reduced. Due to this, the mass flow which is conveyed by the gear pump 32 is then less than the polymer throughput rate which is conveyed by the twin-screw extruder 16. This has the effect of increasing the melt back-pressure in the twin-screw extruder 16 and as a result, makes the reaction time for the polymer longer. The polymer polymerises reaching higher molecular weights. This increases the viscosity of the melt which leads to an increase in the drop in pressure in the flat-slit capillary die 34 and at the same time, counteracts the interference.

Alternatively, instead of the speed of the gear pump 32, the quantity of the moderator added in order to influence the molecular weight may be controlled, i.e. should the viscosity and as a result, the molecular weight of the polymer be reduced, the addition of the moderator is also reduced, with the result that the molecular weight and the viscosity of the melt is again increased to the desired extent.

EXAMPLE 18

Process engineering concept of on-line FTIR measurement in order to determine monomer conversion in the polymerised polymer which arises from one-stage reactive extrusion and controlling polymerisation by changing the die resistance.

In the case of a process engineering concept according to Example 14, analogous to Example 17, the polymer which arises at the end of the twin-screw extruder 16 when coming out of the die may be measured using FTIR spectroscopy. In contrast to Example 17, in which the whole polymer mass flow was used to ascertain the rheological properties, only a very small partial flow is needed to characterize this using FTIR spectroscopy. Therefore, just in front of the die, a small partial flow is removed from the polymer flow via a bypass which is fed via an electrically heated channel to an IROS 100 radioscopic FTIR spectrometer. In order to be able to determine the monomer conversion using FTIR spectroscopy, a calibration curve with the ratio [PLA]/[LA] versus A1323/A935 was recorded. At the same time, the [PLA]/[LA] ratio was ascertained using SEC and 1HNMR spectroscopy. The absorption signal at 1323 cm-1 is assigned a vibration which occurs both in the polymer as well as in the monomer while the weak and monomodal absorption signal at 935cm-1 is characteristic of a monomer.

With the aid of this calibration function, the respective monomer content and as a result, the monomer conversion may be determined on-line. A signal ascertained from this is then used via a control circuit in order to control the die resistance, as described in Example 17, via the speed control of a gear pump 32 which functions as a die with variable die resistance. Consequently, according to the quality requirements of the polymer, different control strategies are possible which may also be combined with one another (e.g. Example 17+Example 18).

What is claimed is:

1. An aliphatic polyester and/or copolyester, obtained from a polyreaction of at least one monomer selected from lactides, lactones, cyclic carbonates or cyclic anhydrides wherein a reactive mixture is used in the polyreaction, the reactive mixture comprises at least one catalyst of the formula

$$(M) \ (X_1, X_2 \ldots X_m)_n \tag{I}$$

wherein M is a metal selected from group 3–12 of the periodic system and from the elements Al, Ga, In, Tl, Sn, Pb, Sb and Bi; ($X_1, X_2 \ldots X_m$) is a substituent selected from one of the compound classes of alkyls, aryls, oxides, carboxylates, halogenides, and alkoxides and compounds containing elements from group 15 and/or 16 of the periodic system; m is a whole number ranging from 1 to 6, and n is a whole number ranging from 0 to 6 and at least one co-catalyst of the formula $$(Y)(R_1, R_2 \ldots R_q)_p \quad (II)$$

where Y is an element selected from group 15 or 16 of the periodic system; $(R_1, R_2 \ldots R_q)$ is a substituent selected from one of the compound classes of alkyls, aryls, oxides, halogenides, oxyalkyls, aminoalkyls, thioalkyls, phenoxides, aminoaryls, and thioaryls; q is a whole number ranging from 1 to 6, and p is a whole number ranging from 0 to 6, wherein the number average molecular weight of the polyester and/or copolyester is between 30,000 and 300,000 g/mol.

2. The aliphatic polyester and/or copolyester according to claim 1, wherein the molar ratio of the co-catalyst to the catalyst is within the range of 100:1 to 1:100.

3. The aliphatic polyester and/or copolyester according to claim 1, wherein the catalyst comprises a compound containing tin.

4. The aliphatic polyester and/or copolyester according to claim 1, wherein the cocatalyst comprises a phosphorus compound of the formula $P(R_1, R_2, R_3)_3$ wherein $R_1$, $R_2$ and $R_3$, are selected from aryls and alkyls.

5. The aliphatic polyester and/or copolyester according to claim 1, wherein the co-catalyst is triphenyl phosphine $(P(Ph)_3)$.

6. The aliphatic polyester and/or copolyester according to claim 1, which further comprises a stabilizer.

7. The aliphatic polyester and/or copolyester according to claim 6, wherein the stabilizer comprises organophosphite, phenolic compounds or mixtures thereof.

8. The aliphatic polyester and/or copolyester according to claim 1, wherein a stabilizer is added to the reaction mixture and the stabilizer is in a volume percentage of less than 2 weight fractions for every 20 weight fractions of monomer.

9. The aliphatic polyester and/or copolyester according to claim 1, further comprising a moderator.

10. The aliphatic polyester and/or copolyester according to claim 1, further comprising a filler, reinforcing agent or both.

11. The aliphatic polyester and/or copolyester according to claim 10, wherein the filler, reinforcing agent, or both is provided with reactive end-groups in order to moderate the molecular weight of the polyester, copolyester or both.

12. The aliphatic polyester and/or copolyester according to claim 1, wherein the average molecular weight is between 80,000 and 200,000 g/mol and the molecular weight ratio Mw/Mn is $\leq 2.0$.

13. The aliphatic polyester and/or copolyester according to claim 1, wherein the percentage of monomer in the polymer amounts to less than 5 per cent of the weight.

14. The aliphatic polyester and/or copolyester according to claim 1, wherein the molar ratio between the monomer or a mixture of monomers used and the catalyst/cocatalyst mixture amounts to at least 5000:1.

15. The aliphatic polyester and/or copolyester according to claim 1, wherein the monomer or a mixture of monomers has a free acid content of a maximum of 10 mequ/kg and a water content of a maximum of 200 ppm.

16. A process for manufacturing aliphatic polyesters and/or copolyesters using an extrusion machine comprising reacting at least one monomer from the group of lactides, lactones, cyclic carbonates or cyclic anhydrides, in a reactive mixture of at least one catalyst of the formula $$(M)(X_1, X_2 \ldots X_m)_n \quad (I)$$

where M is a metal selected from group 3–12 of the periodic system and from the elements Al, Ga, In, Tl, Sn, Pb, Sb and Bi; $(X_1, X_2 \ldots X_m)$ is a substituent selected from one of the compound classes of alkyls, aryls, oxides, carboxylates, halogenides, and alkoxides and compounds containing elements from group 15 and/or 16 of the periodic system; m is a whole number ranging from 1 to 6, and n is a whole number ranging from 0 to 6 and at least one co-catalyst of the formula $$(Y)(R_1, R_2 \ldots R_q)_p \quad (II)$$

where Y is an element selected from group 15 or 16 of the periodic system; $(R_1, R_2 \ldots R_q)$ is a substituent selected from one of the compound classes of alkyls, aryls, oxides, halogenides, oxyalkyls, aminoalkyls, thioalkyls, phenoxides, aminoaryls, and thioaryls; q is a whole number ranging from 1 to 6, and p is a whole number ranging from 0 to 6; and continuously carrying out, a one-stage reactive extrusion process.

17. The process for manufacturing aliphatic polyesters and/or copolyesters according to claim 16, wherein during the oligomerization stage, a thorough mixing and homogenization of the reactive mixture and monomers takes place and during the final polymerization stage, a build-up of pressure with a thermal/mechanical input of energy takes place.

18. The process for manufacturing aliphatic polyesters and/or copolyesters according to claim 16, wherein the extrusion machine is a closely intermeshing co-rotating twin-screw extruder.

19. The process for manufacturing aliphatic polyesters and/or copolyesters according to claim 16, wherein the temperature controllable sections of the extrusion machine have a temperature which ranges between 100 and 230° C.

20. The process for manufacturing aliphatic polyesters and/or copolyesters according to claim 16, wherein the mixture of monomers and the reactive mixture is added to the extrusion machine;

continuously polymerizing the mixture and; discharging the polymer and shaping the polymer.

21. The process for manufacturing aliphatic polyesters and/or copolyesters according to claim 20, wherein the polymer obtained is hardened by cooling.

22. The process for manufacturing aliphatic polyesters and/or copolyesters according to claim 16, further comprising reducing the residual monomer content in the polymer by a degassing unit within the extrusion machine.

23. The aliphatic polyester and/or copolyester according to claim 3 wherein the catalyst is Sn-bis (2-ethylhexanoate).

24. The aliphatic polyester and/or copolyester according to claim 13 wherein the percentage of the monomer in the polymer amounts to less than 2 per cent of the weight.

25. The process according to claim 21 wherein the polymer is cooled by air.

* * * * *